United States Patent
Jokela

(10) Patent No.: US 11,767,249 B2
(45) Date of Patent: Sep. 26, 2023

(54) METHOD AND SYSTEM FOR TREATMENT OF ORGANIC WASTE

(71) Applicant: EVAC OY, Espoo (FI)

(72) Inventor: Jari Jokela, Espoo (FI)

(73) Assignee: EVAC OY, Espoo (FI)

( * ) Notice: Subject to any disclaimer, the term of this patent is extended or adjusted under 35 U.S.C. 154(b) by 0 days.

(21) Appl. No.: 17/510,824

(22) Filed: Oct. 26, 2021

(65) Prior Publication Data

US 2022/0041485 A1 Feb. 10, 2022

Related U.S. Application Data

(62) Division of application No. 16/255,328, filed on Jan. 23, 2019, now Pat. No. 11,267,743.

(30) Foreign Application Priority Data

Jan. 23, 2018 (FI) ..................................... 20185059

(51) Int. Cl.
    *C02F 11/10*     (2006.01)
    *C01B 32/05*     (2017.01)
    *C10L 9/08*     (2006.01)

(52) U.S. Cl.
CPC .............. *C02F 11/10* (2013.01); *C01B 32/05* (2017.08); *C10L 9/086* (2013.01); *C10L 2290/10* (2013.01); *C10L 2290/24* (2013.01); *C10L 2290/46* (2013.01)

(58) Field of Classification Search
CPC ....................................................... C02F 11/10
See application file for complete search history.

(56) References Cited

U.S. PATENT DOCUMENTS

| | | | |
|---|---|---|---|
| 4,017,421 A | 4/1977 | Othmer | |
| 6,966,989 B2 | 11/2005 | Hojsgaard et al. | |
| 2015/0122746 A1 | 5/2015 | Nawawi-Lansade et al. | |
| 2017/0327387 A1 | 11/2017 | Chauzy et al. | |

FOREIGN PATENT DOCUMENTS

| | | |
|---|---|---|
| CN | 104271517 A | 1/2015 |
| CN | 105080337 A | 11/2015 |
| EP | 1604956 A1 | 12/2005 |
| EP | 2390301 A2 | 11/2011 |
| JP | 2004525756 A | 8/2004 |
| JP | 2009120746 A | 6/2009 |
| JP | 2017051943 A | 3/2017 |
| KR | 20090049503 A | 5/2009 |
| KR | 100943315 B1 | 2/2010 |
| KR | 101773151 B1 | 8/2017 |
| WO | 2017023561 A1 | 2/2017 |

OTHER PUBLICATIONS

Search Report for related Finnish Application No. 20185059; report dated Aug. 22, 2018.
EP Search Report for related Application No. 19152729.0; report dated Apr. 18, 2019.
Chinese Search Report for related Application No. 2019100615367; dated Jun. 2, 2021.
Japanese Office Action for related Application No. 2019-008200; dated Sep. 2, 2022.

*Primary Examiner* — Stuart L Hendrickson

(74) *Attorney, Agent, or Firm* — von Briesen & Roper, s.c.

(57) ABSTRACT

Methods and systems for treatment of organic waste by means of hydrothermal carbonization include a mixing tank for receiving organic waste. A first batch of mixed wet waste is fed from the mixing tank to a first thermal reactor to undergo thermal hydrolysis. A second batch of mixed wet waste is fed from the mixing tank to a second thermal reactor to undergo thermal hydrolysis. Bio-char sludge is fed in an alternating manner from the first and second thermal reactors to a bio-char cooler. To save energy, hot and pressurized water from the first thermal reactor is subsequently supplied to the second thermal reactor or from the second thermal reactor to the first thermal reactor in an alternating manner for the respective hydrolysis processes.

4 Claims, 1 Drawing Sheet

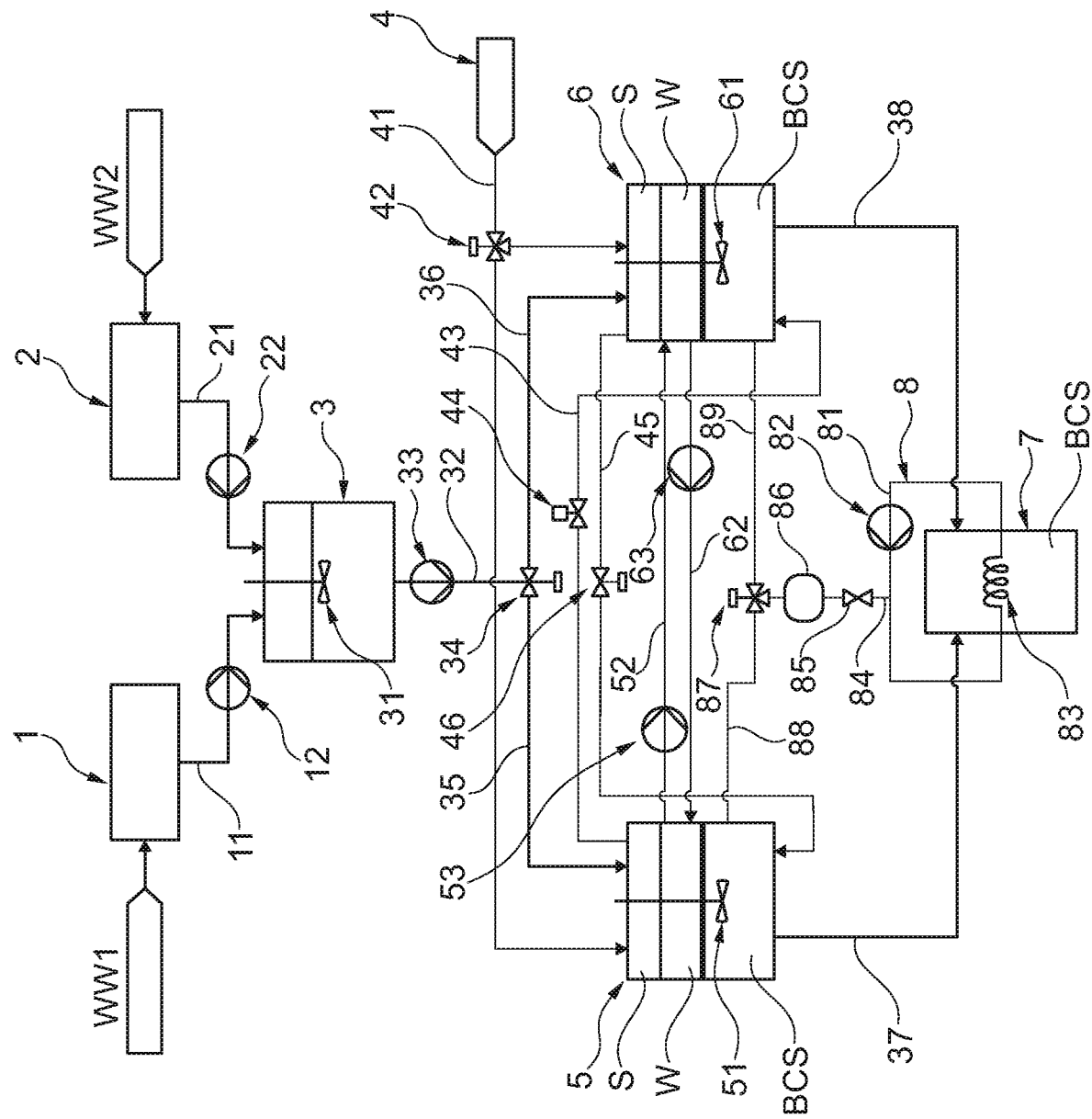

METHOD AND SYSTEM FOR TREATMENT OF ORGANIC WASTE

FIELD

The present disclosure relates to a method for treatment of organic waste by means of hydrothermal carbonization, in which method organic waste is fed from at least one source of organic waste to at least one wet waste tank, organic waste is fed from the at least one wet waste tank to a wet waste mixing tank, a first batch of mixed wet waste is fed from the wet waste mixing tank to a first thermal reactor, in which the first batch of mixed wet waste is subjected to heating and pressurizing under continuous mixing of the mixed wet waste under given process conditions in a thermal hydrolysis process, after which a second batch of mixed wet waste is fed from the wet waste mixing tank to a second thermal reactor, in which the second batch of mixed wet waste is subjected to heating and pressurizing under continuous mixing of the mixed wet waste under given process conditions in a thermal hydrolysis process, after which hydrolysis process bio-char sludge is discharged from the first thermal reactor or the second thermal reactor in an alternating manner to a bio-char cooler for cooling the bio-char sludge, in which method heating and pressurizing for the thermal hydrolysis process is carried out by supplying steam from the first thermal reactor to the second thermal reactor or from the second thermal reactor to the first thermal reactor in an alternating manner for the respective hydrolysis process. The present disclosure also relates to a system for treatment of organic waste by means of hydrothermal carbonization.

BACKGROUND

Hydrothermal carbonization processes for treatment of organic wastes are well known. In general, the pre-heating of feeding material, i.e. organic waste, is carried out by recovering heat by means of a heat exchanger used for cooling treated discharged waste sludge. Due to the high temperature of the discharged waste sludge, organic material easily accumulates on the heat exchanger surfaces, which in due course lowers the overall energy efficiency of the process.

Examples of thermal carbonization systems are known e.g. from US 2017/0327387 A1, US 2015/0122746 A1 and U.S. Pat. No. 6,966,989 B2. The known systems are complex and include multi-stage processes. Attempts to improve efficiency have been made by e.g. cyclic processes and re-using steam from one process stage to another. However, the known systems still remain inefficient and result in a loss of considerable amounts of heat energy.

SUMMARY

An object of the present disclosure is to avoid the above-mentioned drawbacks and to provide a method for efficient treatment of organic waste by way of hydrothermal carbonization in an energy saving manner.

On a general level the present disclosure pertains to a hydrothermal carbonization process, which is a thermo-chemical process with a given process time (duration), in which organic material is disintegrated into carbon-ions by raising the temperature in a closed reactor to about 200-250° C., whereby also the pressure is raised to about 20-25 bar. The organic material disintegrates and the resulting carbon re-condensates into aromatic carbon compounds. The final product of this process is bio-char, the chemical composition of which is similar to fossil coal. The main given process conditions are temperature, pressure and process time (duration). The process conditions can also be called the process parameters.

The basic idea of the disclosure is to provide a sequenced hydrothermal carbonization process, in which at least two parallel thermal reactors are batch fed in an alternating or cyclic manner and in which heat energy for a current batch treatment process is transferred from a preceding batch treatment process by transferring steam and water from the preceding process to the current process. This is achieved in that after steam from the first thermal reactor has been supplied to the second thermal reactor or from the second thermal reactor to the first thermal reactor, hot and pressurized water from the first thermal reactor is supplied to the second thermal reactor or from the second thermal reactor to the first thermal reactor in an alternating manner for the respective hydrolysis process for achieving the given process conditions.

This arrangement makes it possible to achieve a compact system that optimizes the use of energy within the system itself. Therefore, this is an advantageous system to be installed on a marine vessel where the use of space is limited and the supply of external energy is not available.

For starting the hydrolysis process, auxiliary steam from a source of steam is advantageously supplied to the first thermal reactor for initiating a first thermal hydrolysis process in the first thermal reactor.

Advantageously the bio-char sludge is cooled in the bio-char cooler by a heat exchange circuit. This is advantageous in view of energy economy.

The heat exchange circuit is advantageously provided with a cooling water circuit with a circulation pump and a heat exchanger arranged within the bio-char cooler. The steam resulting from the vaporization of water circulated in the cooling water circuit and through the heat exchanger is led to the first thermal reactor or the second thermal reactor in an alternating manner for the respective hydrolysis process. This enhances the energy efficiency of the process.

For achieving the given process conditions, additional mixed wet waste is led into the second thermal reactor or the first thermal reactor in an alternating manner for the respective hydrolysis process. This is an advantageous auxiliary measure, if required.

According to another alternative auxiliary measure for achieving the given process conditions, auxiliary steam is supplied from the source of steam to the second thermal reactor or the first thermal reactor in an alternating manner for the respective hydrolysis process.

The given process conditions include a temperature at a given temperature level of 200-250° C. Further, the given process conditions include a pressure at a given pressure level of 20-25 bar. In view of the duration of the hydrolysis process, the given process conditions include a given process time of 3-5 hours. These given process conditions constitute desired process conditions.

The organic waste is selected from bio-sludge and food waste.

BRIEF DESCRIPTION OF THE DRAWINGS

FIG. 1 is a schematic diagram of a marine vessel incorporating an organic waste treatment system according to the present disclosure.

It should be understood that the drawings are not necessarily drawn to scale and that the disclosed examples are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative examples, it will be appreciated that it can be implemented in various other types of examples and in various other systems and environments.

DETAILED DESCRIPTION

An example of the present disclosure is illustrated in FIG. 1. The system for treatment of organic waste by means of hydrothermal carbonization includes at least one source of organic waste, in this example two sources of organic waste. The organic waste in this example is indicated as a first wet waste WW1 and a second wet waste WW2. The first wet waste WW1 is fed to a first wet waste tank indicated by reference numeral 1. The second wet waste WW2 is fed in a similar manner to a second wet waste tank indicated by reference numeral 2. The first wet waste WW1 is then fed from the first wet waste tank 1 to a wet waste mixing tank 3 by means of a pump 12 through a feeding conduit 11. The second wet waste WW2 is fed in a similar manner from the second wet waste tank 2 to the wet waste mixing tank 3 by means of a pump 22 through a feeding conduit 21. The wet waste mixing tank 3 is provided with a mixing device 31 for mixing the first wet waste and the second wet waste and for providing mixed wet waste for further processing. The wet waste can e.g. be in the form of so-called bio-sludge and food waste.

The method of the present disclosure relates to a method for treatment of organic waste by means of hydrothermal carbonization, which is carried out in sequenced and alternating or cyclic processes, where a first initial process is carried out in a first thermal reactor and subsequently a second process in a second thermal reactor. This is followed by a process in the first thermal reactor, and then again a process in the second thermal reactor. The process sequence thus continues in an alternating manner from reactor to reactor.

In a first initial phase, an initial batch of mixed wet waste is fed from the wet waste tank 3 to a first thermal reactor 5 through feeding conduits 32 and 35 by means of a high-pressure pump 33, which advantageously is a high-pressure piston pump. The flow of the mixed wet waste is directed from the feeding conduit 32 coming from the wet waste tank 3 to the feeding conduit 35 leading to the first thermal reactor 5 by means of a three-way valve 34. The first thermal reactor 5 is provided with a mixing device 51 for providing a continuous mixing of the received mixed wet waste.

For initiating a first thermal hydrolysis process in the first thermal reactor 5, auxiliary steam from a source of steam 4 is supplied to the first thermal reactor 5 by means of a steam conduit 41 connected to the first thermal reactor 5. The flow of auxiliary steam is directed by a three-way valve 42. The process temperature in the first thermal reactor 5 is raised to a given temperature level of about 200-250° C., whereby the pressure level in a corresponding manner is elevated to a given level of about 20-25 bar. The mixed wet waste in the first thermal reactor 5 is at the same time subject to continuous mixing by means of the mixing device 51 and is kept in the reactor for a given process time of about 3-5 hours, preferably for a given time of about 4 hours. The given temperature level, the given pressure level and the given process time discussed above will below be referred to as the given process conditions, in other words the desired process conditions.

When the process in the first thermal reactor 5 is complete, the mixing of the mixed wet waste results in that bio-char sludge BCS is deposited as a sediment on the bottom of the first thermal reactor 5.

After the process in the first thermal reactor 5 is complete, a second batch of mixed wet waste is fed from the wet waste tank 3 to a second thermal reactor 6 through feeding conduits 32 and 36 by means of the high-pressure pump 33. The flow of the mixed wet waste is directed from the feeding conduit 32 coming from the wet waste tank 3 to the feeding conduit 36 leading to the second thermal reactor 6 by means of the three-way valve 34. The second thermal reactor 6 is provided with a mixing device 61 for providing a continuous mixing of the received mixed wet waste.

For initiating a thermal hydrolysis process in the second thermal reactor 6, the temperature and the pressure in the second thermal reactor 6 is raised. This is achieved by supplying steam S from the first thermal reactor 5 through a steam conduit 43 providing a connection between the upper part of the first thermal reactor 5 and the lower part of the second thermal reactor 6. The steam is thus supplied from the upper part of the first thermal reactor 5, in which the steam S has accumulated during the hydrolysis process, to the lower part of the second thermal reactor 6 to mix the wet waste and to distribute heat to the mass of wet waste. The steam conduit 43 is provided with a two-way valve 44 for controlling the flow of steam. The valve 44 is opened and the steam S from the first thermal reactor 5 starts to flow to the second thermal reactor 6 so that the pressure is equalized between the reactors.

After the mixed wet waste has been processed under continuous mixing and under the above discussed given process conditions in the first thermal reactor 5 and bio-char sludge BCS is deposited as a sediment on the bottom of the first thermal reactor 5, the bio-char sludge BCS is led to a bio-char cooler 7 for cooling purposes through a discharge conduit 37. After the bio-char sludge BCS has cooled to a sufficient degree in the bio-char cooler 7, the bio-char sludge BCS can discharged from the bio-char cooler 7 towards a subsequent drying process (not described).

The bio-char cooler 7 is provided with a heat exchange circuit 8 including a cooling water circuit 81 with a circulation pump 82 and a heat exchanger 83 arranged within the bio-char cooler 7. The water circulated by the circulation pump 82 in the cooling water circuit 81 and through the heat exchanger 83 vaporizes during the cooling process, whereby resulting steam can be tapped from the cooling water circuit 81 and led through a steam conduit 84 and a pressurized non-return valve 85 to a pressure vessel 86. Steam can then be led if required from the pressure vessel 86 to the first thermal reactor 5 by means of steam conduit 88, or to the second thermal reactor 6 by means of steam conduit 89, by way of the three-way valve 87. The flow of the steam from the pressure vessel 86 to the steam conduit 88 leading to the first thermal reactor 5, or to the steam conduit 89 leading to the second thermal reactor 6, is thus directed by means off a three-way valve 87.

Finally, hot and high-pressured water W from the first thermal reactor 5 is supplied to the second thermal reactor 6 to a given level by means of a water conduit 52 provided with a pump 53 to provide the given process conditions in the second thermal reactor 6. The pump 53 is advantageously a high-pressure pump for providing the given process conditions. The water conduit 52 provides a connection between the water W levels of the first thermal reactor 5 and the second thermal reactor 6.

If required, additional mixed wet waste is led from the wet waste tank 3 by means of the high-pressure pump 33 to the second thermal reactor 6 so that the pressure level in the second thermal reactor 6 is raised to the given pressure level of about 20-25 bar. If necessary, for achieving the given pressure level, a further raise in pressure can be achieved by supplying auxiliary steam from the source of steam 4 by means of the steam conduit 41. The flow of auxiliary steam is directed by the three-way valve 42.

The process conditions in the second thermal reactor 6 are preferably the same as in the first thermal reactor 5. The hydrothermal carbonization process is exothermal, whereby heat energy is released due to chemical reactions, which secures maintenance of high temperature and high pressure. The reactors provide closed systems after the feeding of mixed wet waste to the reactors, except for the described supply of steam and water.

When the process in the second thermal reactor 6 is completed in a corresponding manner as in the first thermal reactor 5 as discussed above, the process sequence is reversed for carrying out a following hydrothermal process in the first thermal reactor 5 in the same manner as discussed above regarding the second thermal reactor 6.

The processes in the first thermal reactor and the second thermal reactor are carried out in an alternating manner.

After the mixed wet waste has been processed under continuous mixing and under the above discussed given process conditions in the second thermal reactor 6 and bio-char sludge BCS is deposited as a sediment on the bottom of the second thermal reactor 6, the bio-char sludge BCS is led to a bio-char cooler 7 for cooling purposes through a discharge conduit 37. After the bio-char sludge BCS has cooled to a sufficient degree in the bio-char cooler 7, the bio-char sludge BCS can discharged from the bio-char cooler 7 towards a subsequent drying process (not described).

Mixed wet waste is consequently led to the first thermal reactor 5 from the wet waste mixing tank 3 as discussed above.

For initiating a new thermal hydrolysis process in the first thermal reactor 5, the temperature and the pressure in the first thermal reactor 5 is raised. This is achieved by supplying steam S from the second thermal reactor 6 through a steam conduit 45 providing a connection between the upper part of the second thermal reactor 6 and the lower part of the first thermal reactor 5. Steam is thus supplied from the upper part of the second thermal reactor 6, in which steam S has accumulated during the hydrolysis process, to the lower part of the first thermal reactor 5 to mix the wet waste and to distribute heat into the mass of wet waste. The steam conduit 45 is provided with a two-way valve 46 for controlling the flow of steam. The valve 46 is opened and the steam S form the second thermal reactor 6 starts to flow to the first thermal reactor 5 so that the pressure is equalized between the reactors.

For providing the given process conditions in the first thermal reactor 5, hot and high-pressured water W from the second thermal reactor 6 is supplied to the first thermal reactor 5 to a given level by means of a water conduit 62 provided with a pump 63 to. The pump 63 is advantageously a high-pressure pump for providing the given process conditions. The water conduit 62 provides a connection between the water W levels of the second thermal reactor 6 and the first thermal reactor 5.

In other words, both the supply of steam and hot and high-pressure water can be carried out in a similar manner between the first thermal reactor 5 and the second thermal reactor 6 in an alternating manner.

Consequently, the supply of auxiliary steam from the source of steam 4 is not required for initiating the thermal hydrolysis process in the first thermal reactor 5, since steam can be supplied from the second thermal reactor 6.

The other process steps discussed above with regard to the second thermal reactor 6 can thus also, if required, be applied with regard to the first thermal reactor 5.

When the process in the first thermal reactor 5 has been completed, a new process is initiated in the second thermal reactor 6 and so on from reactor to reactor in an alternating manner.

This arrangement makes it possible to achieve a compact system that optimizes the use of energy within the system itself. Therefore, this is a particularly advantageous system to be installed on a marine vessel where the use of space is limited and the supply of external energy is not available.

The description and the accompanying schematic drawings are only intended to clarify the basic idea of the disclosure, whereby the disclosure may vary in detail, e.g. regarding the type of the marine structure, the side walls, the material and structure of the side walls, the activating means, the cover structure, etc., within the scope of the ensuing claims.

What is claimed is:

1. A system for treating organic waste by means of hydrothermal carbonization, comprising:
    a source gf organic waste;
    a wet waste tank for receiving the organic waste;
    a wet waste mixing tank for mixing the organic waste;
    a first thermal reactor receiving a first batch of mixed wet waste from the wet waste mixing tank, the first thermal reactor configured to achieve a first thermal hydrolysis process of the first batch of mixed wet waste;
    a second thermal reactor receiving a second batch of mixed wet waste from the wet waste mixing tank, the second thermal reactor configured to achieve a second thermal hydrolysis process of the second batch of mixed wet waste;
    a bio-char cooler configured to cool bio-char sludge generated by the first thermal reactor and the second thermal reactor; and
    a steam conduit provided with a valve connecting the first thermal reactor and the second thermal reactor and configured to supply steam from the first thermal reactor to the second thermal reactor or from the second thermal reactor to the first thermal reactor in an alternating manner, thereby to provide heat and pressure for a thermal hydrolysis process;
    wherein a water conduit provided with a pump is connected between the first thermal reactor and the second thermal reactor and configured to supply hot and pressurized water from the first thermal reactor to the second thermal reactor and from the second thermal reactor to the first thermal reactor in an alternating manner during the thermal hydrolysis process; and
    wherein the bio-char cooler includes a heat exchange circuit with a cooling water circuit, a circulation pump, and a heat exchanger arranged within the bio-char cooler, and wherein a steam conduit provided with at least one valve is connected to the cooling water circuit, the first thermal reactor, and the second thermal reactor.

2. The system of claim 1, further comprising a source of auxiliary steam connected to the first thermal reactor and the second thermal reactor by way of a steam conduit.

3. The system according to claim 1, wherein the wet waste tank is a first wet waste tank, the system further comprising a second wet waste tank.

4. The system according of claim 1, wherein that the organic waste comprises bio-sludge or food waste.

\* \* \* \* \*